United States Patent
Kasahara et al.

(10) Patent No.: US 6,683,953 B1
(45) Date of Patent: Jan. 27, 2004

(54) ENCODING METHOD, ENCODING-DECODING APPARATUS, AND CODE COMMUNICATIONS SYSTEM

(75) Inventors: Masao Kasahara, 15-3, Aogein 4-chome, Minoo-shi, Osaka (JP); Shinya Kiuchi, Kyoto (JP); Yasuyuki Murakami, Uji (JP)

(73) Assignees: Masao Kasahara, Osaka (JP); Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/361,195

(22) Filed: Jul. 26, 1999

(30) Foreign Application Priority Data

Jul. 27, 1998 (JP) .......................................... 10-211353

(51) Int. Cl.[7] .............................. H04K 1/00; H04L 9/00

(52) U.S. Cl. ............................................ 380/28; 380/59
(58) Field of Search ...................................... 380/28, 59

(56) References Cited

U.S. PATENT DOCUMENTS 6,084,966 A * 7/2000 Maebara et al. .............. 380/43

* cited by examiner

Primary Examiner—Gregory Morse
Assistant Examiner—Christopher J. Brown
(74) Attorney, Agent, or Firm—Hogan & Hartson, LLP

(57) ABSTRACT

Instead of immediately encrypting a plain text, a n-bit plain text is first converted to a m-bit of expanded plain text in order to limit the weight of the plain text to w, and that expanded plain text is then encrypted. By first converting the plain text to the expanded plain text wherein the weight has been limited, a smaller modulus can be used, and therefore the rate (or encryption efficiency) rises.

15 Claims, 12 Drawing Sheets

ENCODING METHOD, ENCODING-DECODING APPARATUS, AND CODE COMMUNICATIONS SYSTEM

BACKGROUND OF THE INVENTION

1. Field of the Invention

The present invention relates to an encryption method for converting plain text to cipher (or encrypted) text, and a code -communications system using that method.

2. Description of the Related Art

In our modern society, which is called a high-level information society, important business textual and graphic information is exchanged in communications and processed as electronic information through computer network infrastructure. One characteristic of such electronic information is that it can easily be duplicated, whereupon it becomes very difficult to distinguish the duplicate from the original. Hence the problem of information security is seen to be critical. This is especially true in view of the fact that the implementation of computer networks that support features such as "computer resource sharing," "multi-access," and "wide area operations" is indispensable to the realization of the high-level information society, but these features involve aspects that are inconsistent with the protection of information exchanged between authorized participants. In this context, attention is now being drawn to coding technologies that in the past have been employed primarily in military and diplomatic communications.

Coding is exchanging of information in such a way that its meaning cannot be understood by anyone other than the authorized parties. In coding operations, the conversion of the original text (plain text) that anyone can understand to text (cipher text) the meaning of which cannot be understood by a third party is called encryption, and the restoration of that cipher text to plain text is called decryption. The overall system wherein this encryption and decryption is performed is called a cryptosystem. In the processes of encryption and decryption, respectively, secret information called encryption keys and decryption keys are employed. A secret decryption key is necessary at the time of decryption, wherefore only a party knowledgeable of that decryption key can decrypt the cipher text. The confidentiality of the information is accordingly maintained by the encryption.

Cryptosystems can be subsumed under two broad categories, namely common key cryptosystems and public key cryptosystems. In a common key cryptosystem, the encryption key and the decryption key are identical, and coded communications are conducted by having both the sending party and receiving party hold the same key. The sending party encrypts plain text based on the common secret key and send it to the receiving party, whereupon the receiving party uses the same key to decrypt the cipher text and restore it to the original plain text.

In contrast thereto, in a public key cryptosystem, the encryption key and decryption key are different. In conducting coded communications in this cryptosystem, the sending party encrypts the plain text with the public key derived from a receiving party, and the receiving party decrypts that cipher text with his or her own secret key. The public key is used for encryption, and the secret key is a key for decrypting the cipher text converted by the public key. The cipher text converted by the public key can only be decrypted using a secret key.

One example of such a public key cryptosystem is seen in the conventional knapsack coding schemes wherein safety is based on the knapsack problem. However, almost all of the knapsack coding schemes now being proposed exhibit either linearity or super-increasing, wherefore it has been demonstrated that they can be decrypted using the Shamir attack method and Lenstra-Lenstra-Lovasz (LLL) algorithms. To overcome this shortcoming, multiplication knapsack coding schemes have been developed which employ power operation over modulo-calculation, an example whereof is seen in the Morii-Kasahara cryptosystem (Masakatsu Morii and Masao Kasahara: "Denshi Joho Tsushin Gakkai [Electronic Information Communications Society]," Vol. j71-D, No. 2 (1988)). This Morii-Kasahara cryptosystem (hereinafter referred to as the MK cryptosystem) is now described.

In this description, the following three definitions are given.

(Divisibility Discriminator Symbol)

A divisibility discriminator symbol < > for determining whether or not b is evenly divisible by a is defined below.

$$\left\langle \frac{b}{a} \right\rangle \stackrel{def}{=} \begin{cases} 0 & (\text{when } b \text{ is not evenly divisible by } a) \\ 1 & (\text{when } b \text{ is evenly divisible by } a) \end{cases}$$

(Scalar exponentiation) $C=A^e$

If A and C are vectors and e is a scalar, then scalar exponentiation is defined as follows.

(Scalar exponentiation) $C=A^e$ $$c_{ij} = a^e_{ij}$$

(Matrix right exponentiation) $C=A^B$

If A, B, and C are vectors, then right exponentiation of matrix is defined as follows.

(matrix right exponentiation) $C = A^B$ $$c_{ij} = \prod_k a_{ik}^{b_{kj}}$$

(Key Generation)

In the MK cryptosystem, the secret and public keys are generated as follows.

| Secret key | |
|---|---|
| secret vector a | vector a = $^t(a_1, a_2, \ldots, a_n)$ |
|  | gcd $(a_i, a_j) = 1$ $(i \neq j)$ |
| encryption key e | gcd $(e, p_{MK} - 1) = 1$ |
| decryption key d | $ed = 1 \pmod{p_{MK} - 1}$ |
| Public key | |
| modulus (prime) $p_{MK}$ | to satisfy Condition 1 below |
| public vector c | vector c = vector $a^e \pmod{p_{MK}}$ |

Condition 1:

$$p_{MK} > \prod_{i=1}^{n} a_i \quad (1)$$

(Encryption)

Treating the plain text as the vector $x=^t(x_1, x_2, \ldots, x_n)$, the sending party creates the cipher text C by the following equation and sends it to the receiving party.

$$C = {}^t c^x = \prod_{i=1}^{n} c_i^{xi} \pmod{p_{MK}}$$

(Decryption)

The receiving party, using the following equation, raises the received cipher text C to the power of d and converts it to A.

$$A = C^d = ({}^t c^x)^d = {}^t a^{edx} = {}^t a^x \pmod{p_{MK}}$$

Then, as represented in the following equation, divisibility determination is performed on A using the components of the secret vector a, whereby decryption can be done to obtain the original plain text vector.

$$x = {}^t\left(\left(\frac{A}{a_1}\right), \left(\frac{A}{a_2}\right), \ldots, \left(\frac{A}{a_n}\right)\right)$$

Specific examples involving this MK cryptosystem are described next.

(Key Generation)

Secret key
  vector $a = {}^t(13, 9, 25, 16, 7, 17)$
  $e = 1501$, $d = 11131$

Public key
  $p_{MK} = 5569211$ to satisfy Condition 2 below $$\text{vector } c = \text{vector } a^e$$
$$= {}^t(13^{1501}, 9^{1501}, 25^{1501}, 16^{1501}, 7^{1501}, 17^{1501})$$
$$= {}^t(5097951, 4832634, 2171018, 2905496,$$
$$1517072, 319194) \pmod{5569211}$$

Condition 2:

$$p_{MK} = 5569211 > \Pi_{i=1}^{6} a_i = 5569200 \quad (2)$$

(Encryption)

Encryption is performed, treating the plain text as the vector $$x = {}^t(1, 0, 1, 1, 1, 0).$$

$$C = 5097951 \cdot 2171018 \cdot 2905496 \cdot 1517072$$
$$= 5328558 \pmod{5569211}$$

(Decryption)

After raising the cipher text C to the power of d to obtain A, the original plain text vector x is obtained by performing divisibility determination on A using the components of the secret vector a, as in Equation 3 below.

$$A = C^d = 5328558^{11131} = 36400 \pmod{5569211}$$

$$x = {}^t\left(\left(\frac{36400}{13}\right), \left(\frac{36400}{9}\right), \left(\frac{36400}{25}\right), \left(\frac{36400}{16}\right), \left(\frac{36400}{7}\right), \left(\frac{36400}{17}\right)\right) \quad (3)$$
$$= {}^t(1, 0, 1, 1, 1, 0)$$

The MK cryptosystem described in the foregoing is thought to provide a high degree of safety, but has problems, namely that the cipher text rate is low relative to the plain text rate, and that encryption efficiency is poor. If we here represent the size of the plain text and cipher text as n bits and k bits, respectively, we can define the encryption efficiency as the rate η by the Equation 4 below.

$$\eta = n/k \quad (4)$$

In MK encryption, the plain text is divided into n-bit block units, so the size of the plain text becomes a constant (n bits). The size of the cipher text, on the other hand, is determined solely by the size of the modulus $p_{MK}$. Accordingly, the following Equation 5 is established for the rate $\eta_{MK}$ in the MK encryption.

$$\eta_{MK} = \frac{n}{\log_2 p_{MK}} < \frac{n}{\log_2 \prod_{i=1}^{n} a_i} = \frac{n}{\sum_{i=1}^{n} \log_2 a_i} \quad (5)$$

Thus, in the MK cryptosystem, it is necessary to make the modulus a prime number that is larger than the product of all $a_i$ (see Equation 1), wherefore the value of the rate $\eta_{MK}$ is not always high. Even if the average size of $a_i$ is made 10 bits, for example, in Equation 5, the upper limit of the rate $\eta_{MK}$ will be no more than 0.1 or so. And even if prime numbers are used in order beginning from the smallest, as in vector $a = {}^t(2, 3, 5, 7, \ldots)$, the rate $\eta_{MK}$ will be around 0.156 when $n = 60$. There is also a problem of the value of the modulus being too high, resulting in low practicality.

SUMMARY OF THE INVENTION

The present invention was devised in view of the circumstances described in the foregoing.

An object of the present invention is to provide an encryption method which can greatly improve the rate in comparison with conventional MK cryptosystems, together with a code communications system using that method.

Another object of the present invention is to provide a practical encryption method which is executable with a modulus of small value.

The encryption method according to one aspect of the present invention is an encryption method for converting binary sequence plain text into cipher text, wherein the plain text is converted into binary sequence expanded plain text having a larger number of bits than the original plain text, and that expanded plain text is encrypted into cipher text.

The conversion of the plain text into the expanded plain text may be performed so as to limit the weight of the plain text. If the number of bits in the plain text and the expanded plain text is expressed by n and m (where n<m) respectively and the weight of the plain text is limited to w, m may be determined so as to satisfy the relationship ${}_m C_w \geq 2^n$. When converting the plain text to the expanded plain text, a Schalkwijk decoding algorithm may be used.

When the number of bits of the plain text and the expanded plain text is n and m (where n<m) respectively and the weight of the plain text is limited to w or lower, m may be determined satisfy Condition A shown below.

Condition A:

$$\sum_{k=0}^{w} {}_m C_k \geq 2^n \quad (A)$$

When converting the plain text to the expanded plain text, an extended Schalkwijk decoding algorithm may be used.

According to another aspect of the present invention, there is provided an encryption method for converting a binary sequence of n bits of plain text to cipher text comprising the steps of: finding m (where n<m) which satisfies the condition $_mC_w \geq 2^n$, in order to limit the weight of the n bits of plain text to w; converting the n bits of plain text to a binary sequence of m bits of expanded plain text by a Schalkwijk decoding algorithm while assuming that the n bits of plain text be an integer and this integer be an index; and producing cipher text using the expanded plain text and a public key.

According to the third aspect of the present invention, there is provided an encryption method for converting a binary sequence of n bits of plain text to cipher text comprising the steps of: finding m (where n<m), which satisfies Condition A noted below, in order to limit the weight of the n bits of plain text to w; converting the n bits of plain text to a binary sequence of m bits of expanded plain text by an extended Schalkwijk decoding algorithm while considering that the n bits of plain text be an integer and this integer be an index; and producing cipher text using the expanded plain text and a public key.

Condition A:

$$\sum_{k=0}^{w} {}_mC_k \geq 2^n \quad (A)$$

According to the fourth aspect of the present invention, there is provided an encryption/decryption apparatus which comprises: an encryptor for producing cipher text from plain text using one of the encryption methods described above; and a decrypter for decrypting the cipher text so produced back into the original plain text.

According to the fifth aspect of the present invention, there is provided a code communications system for communicating information based on cipher text between a plurality of entities, comprising: an encryptor for producing cipher text from plain text using one of the encryption methods described above; a communication path for transmitting the cipher text from one entity to another entity; and a decrypter for decrypting the cipher text so transmitted back into the original plain text.

The concept underlying the encryption method of the present invention is now described.

FIG. 1A of the accompanying drawings illustrates the concept underlying a conventional MK cryptosystem and FIG. 1B illustrates the encryption method of the present invention.

In the conventional MK cryptosystem, the number of bits having weight (the number of 1s) cannot be limited, wherefore the prime number $p_{MK}$ that becomes the modulus must be determined in consideration of the product of all of the secret vector components so that decryption can uniquely be done even when all of the components of the plain text are 1s. Accordingly, that prime number $p_{MK}$ always ends up being a large number. As a result, as diagramed in FIG. 1A, the number of bits in the cipher text becomes large, so that only a low rate can be obtained.

If the plain text is converted to a binary sequence with a limited weight prior to the encrypting conversion, and that binary sequence is treated as plain text and subjected to MK encryption, unique decryption can be guaranteed without using the large modulus. The present invention takes advantage of this principle. Specifically, the binary sequence plain text is first converted to binary sequence plain text having limited weight (expanded plain text), and then that expanded plain text is encrypted. This two-step (conversion-encrypting) process is diagramed in FIG. 1B. Conversion to the expanded plain text is done first, wherefore the bit count increases to a certain extent at that point, but the weight has been limited so that in the subsequent encryption a smaller modulus can be used than in the conventional MK cryptosystem. As a result, the number of bits in the cipher text can be made smaller than conventionally. Consequently, the rate can be sharply improved.

As a procedure for converting plain text to expanded plain text of limited weight, either a Schalkwijk algorithm or an extended Schalkwijk algorithm (which will be defined below) obtained by extending that Schalkwijk algorithm can be used. Hereinafter, the encryption method of the present invention which uses a Schalkwijk algorithm is called the first invention, and the encryption method of the present invention which uses an extended Schalkwijk algorithm is called the second invention. These are now described in more specific terms.

First Invention

A brief description is first given here of the Schalkwijk algorithm. Let us consider a set S(m,w) of binary vectors containing size bits m and constant weight value bits w. The Schalkwijk algorithm is a known procedure for making a definitive (or one-to-one) association between any vector s belonging to S(m,w) and an index i from 0 to $_mC_w-1$. When a Schalkwijk encoding algorithm is employed, the index i corresponding to an arbitrary vector s∈S(m,w) can be found. Conversely, when a Schalkwijk decoding algorithm is employed, the vector s∈S(m,w) corresponding to a given index i can be found. (Schalkwijk encoding algorithm)

To find an index i from a sequence vector s having a size of m bits and a weight of w bits (s=($s_1$, . . . , $s_m$)∈S(m,w)):

```
Schalkwijk Encode (s)
{
    j <- 0;      h <- 0;
    for (k = 1 to m)
        if (s_k = 1)
            {h <- h + 1;    j <- j + _{k-1}C_h}
    i <- j;
    return (i);
}
```

(Schalkwijk Decoding Algorithm)

To find a size m bit and weight w bit sequence vector s=($s_1$, . . . , $s_m$)∈S(m,w) from an index i:

```
Schalkwijk Decode (i,m,w)
{
    j <- i;      h <- w;
    for (k = 1 to m)
        if (j ≥ _{m-k}C_h)
            {j <- j - _{m-k}C_h;    h <- h - 1;    s_{m-k+1} <- 1;}
        else
            s_{m-k+1} <- 0;
    return (s);
}
```

The encryption and decryption procedures in the first invention are now described. In the first invention, using the Schalkwijk algorithms described in the foregoing, the original plain text is converted to expanded plain text wherein the weight value is limited to w, and that expanded plain text is encrypted as in the conventional MK cryptosystem. In FIG. 2 of the accompanying drawings is given a flowchart for the encryption processing procedure, while in FIG. 3 is given a flowchart for the corresponding decryption processing procedure. When the sizes of the expanded and original plain texts are m bits and n bits, respectively, the difference (m−n) is defined as the expanded bit count.

<<Encryption>>

(Expanded Plain Text Conversion)

In order to limit the plain text weight to w, the size m of the expanded plain text which satisfies Condition 6 below is found (step S1). Treating an n-bit plain text vector x as an integer, and taking this integer as the index i, we use the Schalkwijk decoding algorithm to convert the plain text vector x to the expanded plain text vector s∈S(m,w) (step S2).

Condition 6:

$$_mC_w \geq 2^n \tag{6}$$

(Encrypting Conversion)

A prime number $p_A$ which satisfies Condition 7 below is found (step S3).

Condition 7:

$$p_A > \underset{s \in S(m,w)}{\text{Max}} (^t a^s) \tag{7}$$

The symbol Max ( ) indicates the maximum value in the parentheses ( ), and the vector a is a secret vector comprised of m components.

The receiving party determines e and finds d using $p_A - 1$ as the modulus. A public vector c is generated as in the conventional MK cryptosystem. The sending party generates cipher text C, as follows, using the public vector c and the expanded plain text vector s of the receiving party (step S4).

$$C = {}^t c^s (\bmod p_A)$$

<<Decryption>>

(Decrypting Conversion)

The cipher text C is decrypted as in the conventional MK cryptosystem, and the expanded plain text vector s belonging to S(m,w) is found (step S11).

(Plain Text Conversion)

The expanded plain text vector s is decrypted using the Schalkwijk decoding algorithm and thereby converted to the index i (step S12). This is treated as an n-bit binary number and the original plain text vector x is obtained (step S13).

Second Invention

A brief description is first given of the extended Schalkwijk algorithm as defined by the inventors with reference to Schalkwijk. A set T(m,w) of binary vectors having a size of m bits and a weight of w bits at most is posited. Specifically, the following conditions are satisfied.

$$T(m, w) = \bigcup_{0 \leq j \leq w} S(m, j)$$

Here, the extended Schalkwijk algorithm is defined as an operation for definitively associating any vector s belonging to T(m,w) with an index i given by Equation 8 below.

$$0 \sim \sum_{g=0}^{w} {}_m C_g - 1 \tag{8}$$

Using the extended Schalkwijk encoding algorithm, we can find the index i associated with an arbitrary vector s∈T(m,w). Conversely, using the extended Schalkwijk decoding algorithm, we can find the vector s∈T(m,w) corresponding to a given index i.

(Extended Schalkwijk Encoding Algorithm)

To find the index i from a sequence vector s=(s$_1$, . . . , s$_m$)∈T(m,w) having a size of m bits and a weight of w bits or less (where w(s) is the weight of the vector s):

Extended Schalkwijk Encode(s)

{

$$i \Leftarrow \text{SchalkwijkEncode}(s) + \sum_{g=0}^{w(S)-1} {}_m C_g;$$

return(i);

}

(Extended Schalkwijk Decoding Algorithm)

To find the sequence vector s=(s$_1$, . . . , s$_m$)∈T(m,w) having a size of m bits and weight of w bits or less, from the index i:

Extended Schalkwijk Decode(i, m)

{

$$w' \Leftarrow 0;$$

$$\text{while}\left(i - \sum_{g=0}^{w'} {}_m C_g \geq 0\right)\{w' \Leftarrow w' + 1;\}$$

$$w \Leftarrow w' - 1;$$

$$i' \Leftarrow i - \sum_{g=0}^{w} {}_m C_g$$

$$s \Leftarrow \text{SchalkwjkDecode}(i', m, w)$$

return(s);

}

The procedures for encryption and decryption in the second invention are described next. In the first invention, the rate is improved by converting the plain text to expanded plain text having its weight limited to the constant value w, prior to encryption conversion, using a Schalkwijk algorithm. In the second invention, the extended Schalkwijk algorithm described earlier is used to allow the weight of the expanded plain text to have a value equal to or lower than w, and thereby improving the rate even further than in the first invention. FIG. 4 of the accompanying drawings depicts a flowchart for the encryption procedure according to the second invention and FIG. 5 depicts a flowchart for the decryption procedure.

<<Encryption>>

(Expanded Plain Text Conversion)

In order to limit the plain text weight to w or lower, the size m of expanded plain text that satisfies Condition 9 below is sought (step S21).

Condition 9:

$$\sum_{k=0}^{w} {}_m C_k \geq 2^n \tag{9}$$

Treating an n-bit plain text vector x as an integer and taking this integer as the index i, we use the extended Schalkwijk decoding algorithm to convert the plain text vector x to the expanded plain text vector s∈T(m,w) (step S22).

(Encrypting Conversion)

A prime number $p_B$ which satisfies Condition 10 below is found (step S23).

Condition 10:

$$p_B > \max_{s \in T(m,w)} ({}^t a^s) \quad (10)$$

The receiving party determines e and finds d using $p_B - 1$ as the modulus. A public vector c is generated as in the conventional MK cryptosystem. The sending party generates cipher text C, as follows, using the public vector c and the expanded plain text vector s of the receiving party (step S24).

$$C = {}^t c^s (\text{mod } p_B)$$

<<Decryption>>

(Decrypting Conversion)

The cipher text C is decrypted as in the conventional MK cryptosystem, and the expanded plain text vector s belonging to T(m,w) is found (step S31).

(Plain Text Conversion)

The expanded plain text vector s is decrypted using the extended Schalkwijk decoding algorithm and thereby converted to the index i (step S32). This is treated as an n-bit binary number and the original plain text vector x is obtained (step S33).

DETAILED DESCRIPTION OF THE INVENTION

Embodiments of the present invention are now described in reference to FIGS. 6 through 14.

Figure 1A:
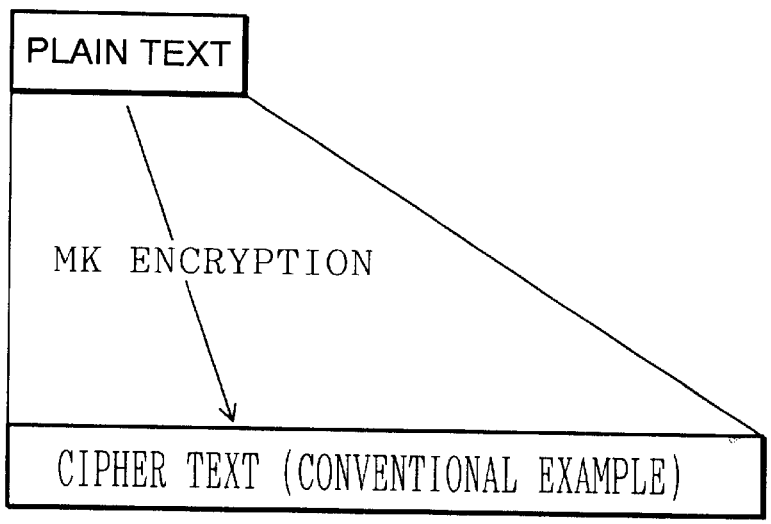
FIG. 1A diagrams the concept of encryption in a conventional example.
Figure 1B:
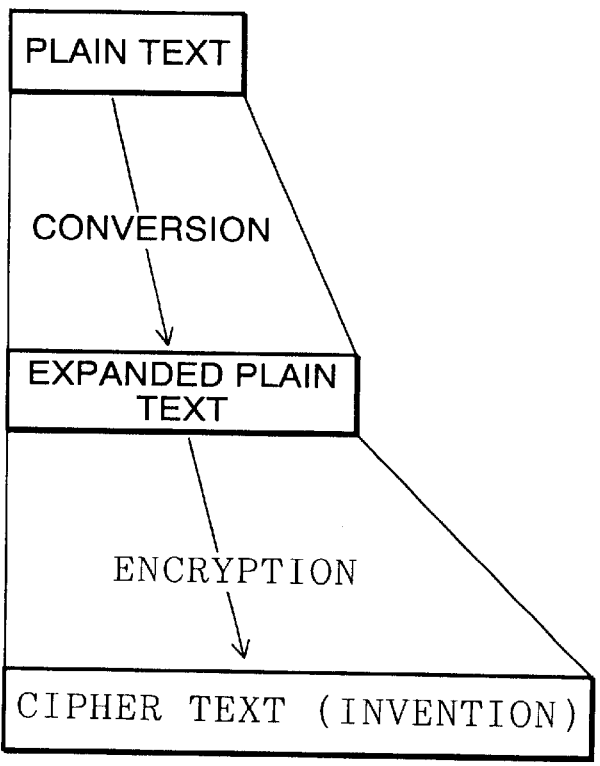
FIG. 1B diagrams the concept of encryption in the present invention.
Figure 2:
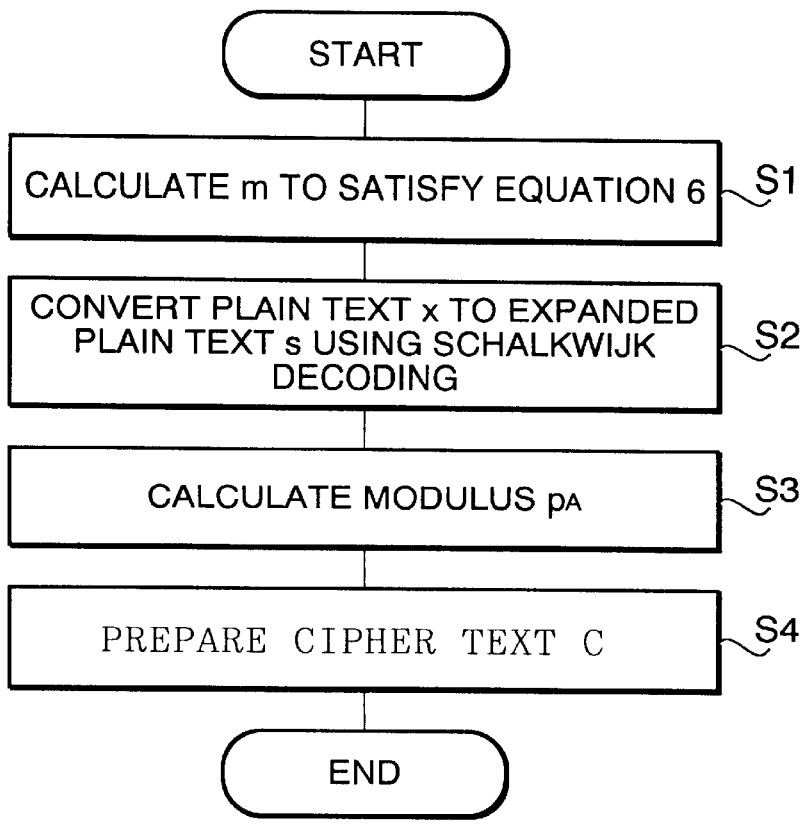
FIG. 2 is a flowchart for encrypting procedures in the first invention.
Figure 3:
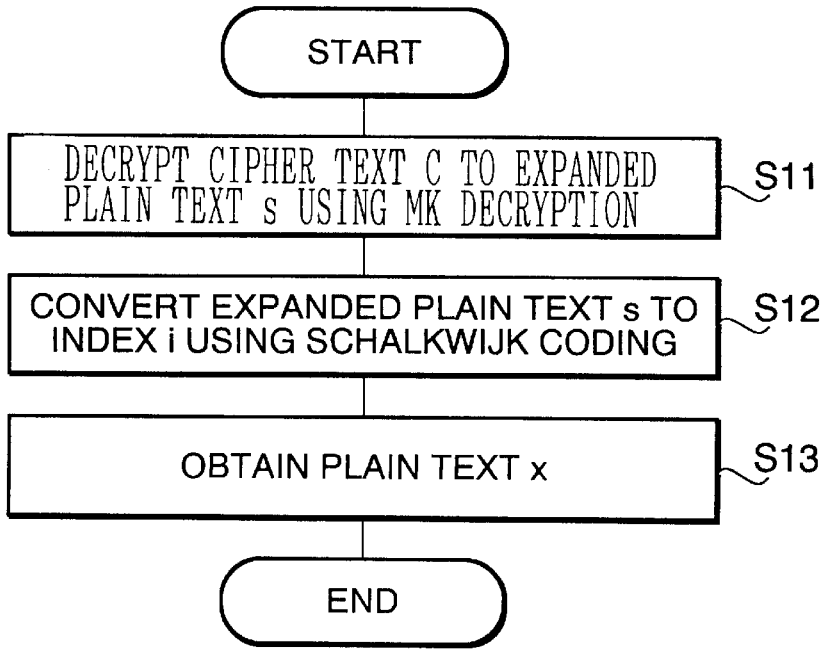
FIG. 3 is a flowchart for decryption procedures in the first invention.
Figure 4:
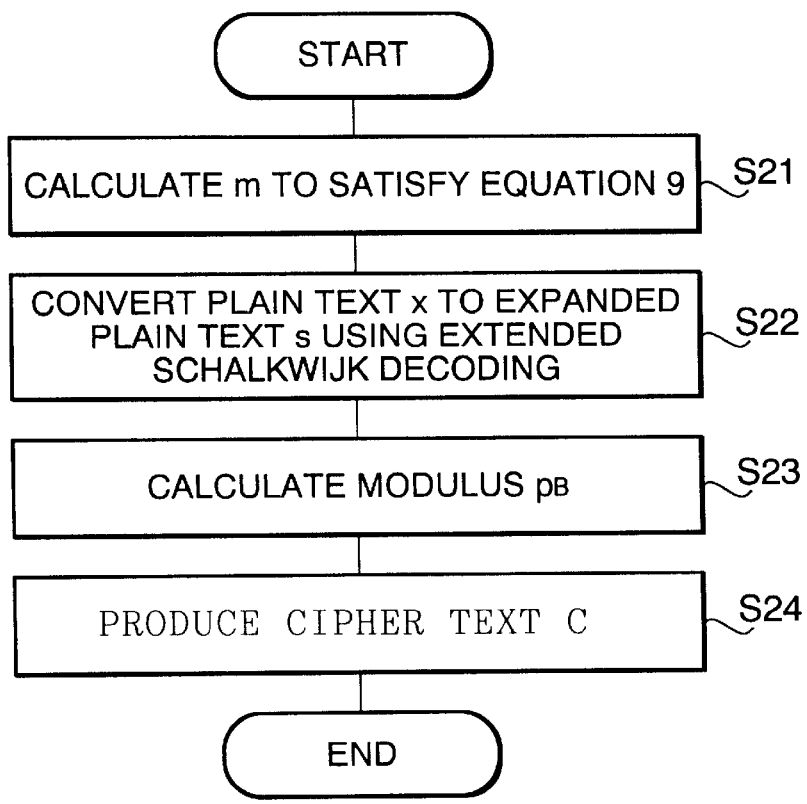
FIG. 4 is a flowchart for encrypting procedures in the second invention.
Figure 5:
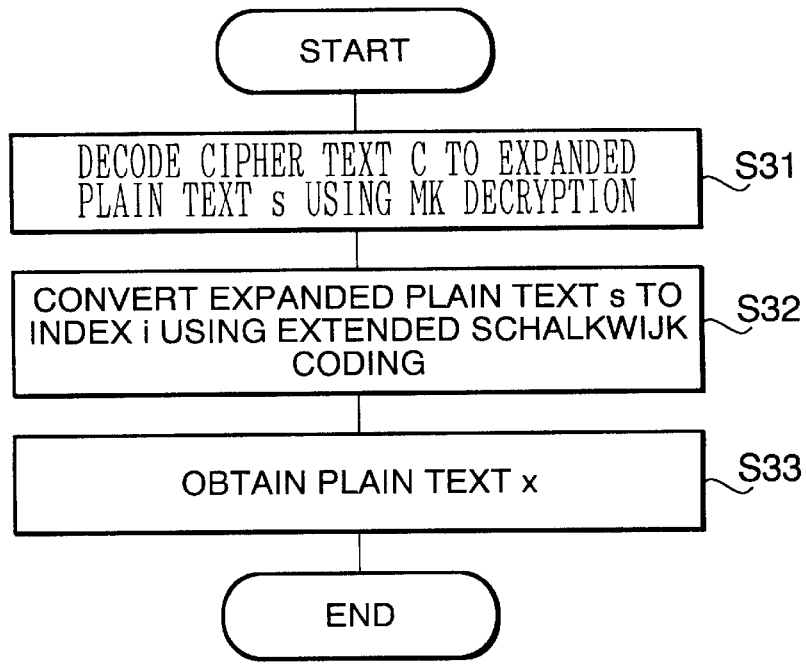
FIG. 5 is a flowchart for decryption procedures in the second invention.
Figure 6:
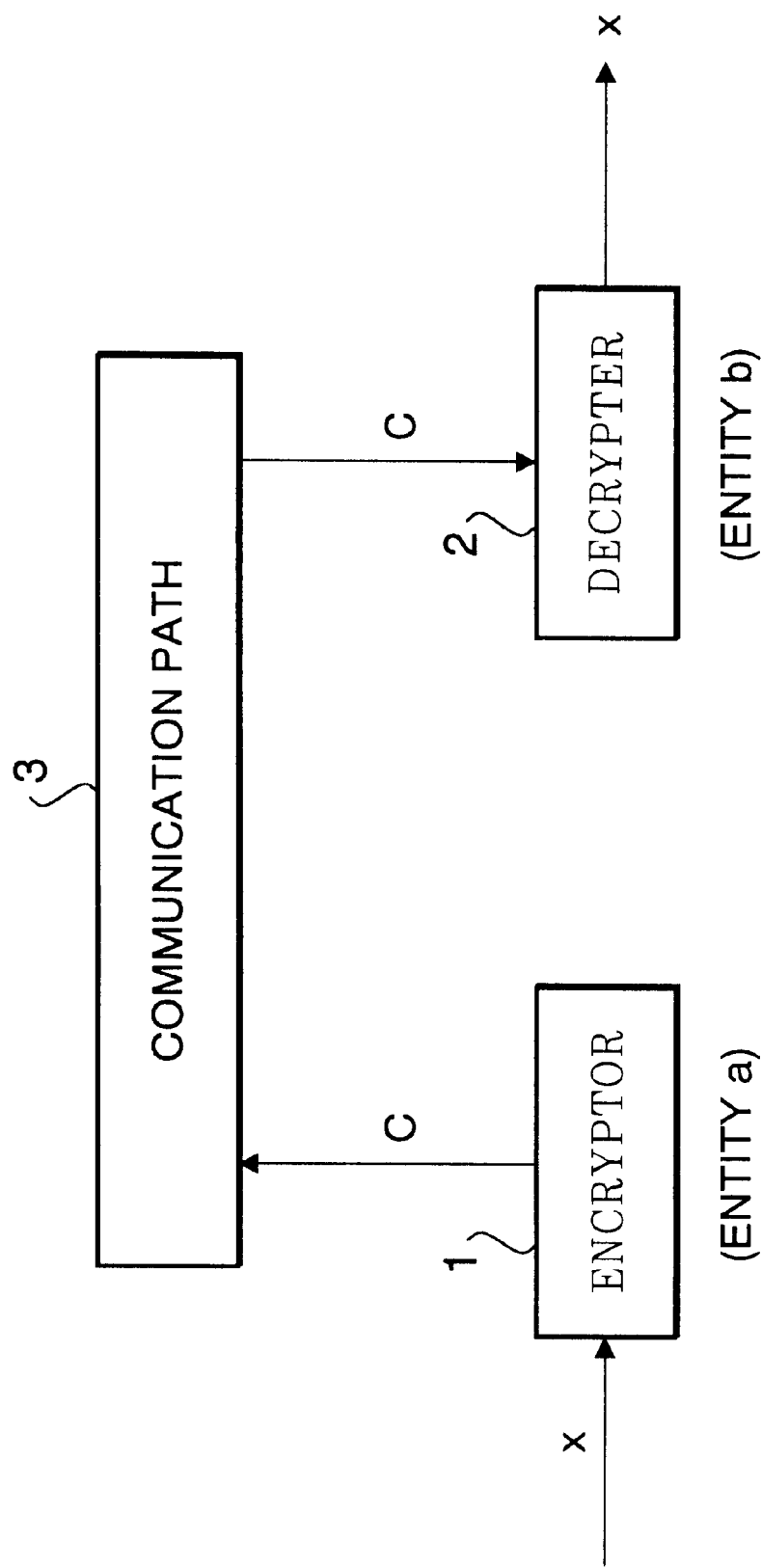
FIG. 6 is a model diagram representing information communications between two entities.

Referring to FIG. 6, illustrated is a simplified example of communications wherein the encryption method of the present invention is used for information communications between two entities a and b. In the diagramed example, one entity, namely entity a, encrypts plain text x into cipher text C with an encryptor 1, sends that cipher text C to another entity, namely entity b, via a communications network 3, and entity B decrypts the cipher text C back to the original plain text x with a decrypter 2.

First Embodiment

A first embodiment according to the present invention, which will be described below, is based on the first invention described earlier. In this first embodiment (the first invention), the number of bits in the plain text vector x is set at 6 (n=6), and the weight to which the plain text is limited is set to 3 (w=3). Accordingly, the number of bits in the expanded plain text vector s is determined at 9 (m=9) to satisfy Condition 6 (specifically ${}_m C_3 \geq 2^6$).

The secret key and the public key are generated as follows.

| Secret key | |
|---|---|
| secret vector a | vector a = ${}^t(a_1, a_2, \ldots, a_9)$ |
| | gcd $(a_i, a_j) = 1$ $(i \neq j)$ |
| encryption key e | gcd $(e, p_A - 1) = 1$ |
| decryption key d | $ed = 1 \pmod{p_A - 1}$ |
| Public key | |
| modulus (prime) $p_A$ | $p_A > a_i \cdot a_j \cdot a_k$ |
| | ($a_i$ $a_j$ and $a_k$ are three largest components in vector a.) |
| public vector c | vector c = vector $a^e \pmod{p_A}$ |

As specific examples, the secret and public keys are generated as follows.

vector a=t(13, 9, 25, 16, 7, 17, 11, 19, 23) e=69) d=317
Public key
$p_A = 109371 > 25 \cdot 23 \cdot 19 = 10925$ $$vector\ c = vector\ a^e$$
$$= {}^t(13^{69}, 9^{69}, 25^{69}, 16^{69}, 7^{69}, 17^{69}, 11^{69}, 19^{69}, 23^{69})$$
$$= {}^t(35, 5987, 2161, 4402, 711, 5002, 2522, 1259, 7774)$$
$$(\text{mod } 10937)$$

At the entity a end, the plain text is made the vector x=${}^t(1,0,1,1,1,0)$=46 and expansion-converted by Schalkwijk decoding to vector s=(0,1,0,0,0,1,0,1,0), and that expanded plain text vector s is encrypted to yield the coded text C. This coded text C thus produced is transmitted over the communications network 3 from entity a to entity b (FIG. 6).

$$C = 5987 \cdot 5002 \cdot 1259$$
$$= 10796 \pmod{10937}$$

On the entity b end, the received cipher text C is raised to the power of d to convert it to A, a divisibility determination is made on A using the components of the secret vector a, and the expanded plain text vector s is obtained.

$A = C^d = 10796^{317} = 2907 \pmod{10937}$ $$s = {}^t\left(\left(\frac{2907}{13}\right), \left(\frac{2907}{9}\right), \left(\frac{2907}{25}\right), \left(\frac{2907}{16}\right), \left(\frac{2907}{7}\right), \left(\frac{2907}{17}\right), \right.$$
$$\left.\left(\frac{2907}{11}\right), \left(\frac{2907}{19}\right), \left(\frac{2907}{23}\right)\right)$$
$$= {}^t(0, 1, 0, 0, 0, 1, 0, 1, 0)$$

From the expanded plain text vector s is obtained, by employing Schalkwijk encoding, the plain text vector x46=(1,0,1,1,1,0).

Whereas in the conventional MK encryption method described earlier we had a modulus $p_{MK}$=556921 and a rate $\eta_{MK} \approx 0.26$, in this first embodiment described above we have a modulus $p_A$=109371 and a rate $\eta_A \approx 0.43$. Hence, with only a 3-bit plain text expansion, we can realize a rate nearly double the conventional rate.

Let us now consider how this first invention may be evaluated. For the rate $\eta_A$ in this first invention, we may derive Equation 11 below from Equation 7 noted earlier.

$$\eta_A = \frac{n}{\log_2 p_A} < \frac{n}{\log_2 \left\{ \max_{s \in S(m,w)} ({}^t a^s) \right\}} \quad (11)$$

Whereas the rate is dependent only on the vector a in the case of the conventional MK encryption method, in the case of the first invention, the rate is dependent on the weight w as well as on the vector a.

Figure 7:
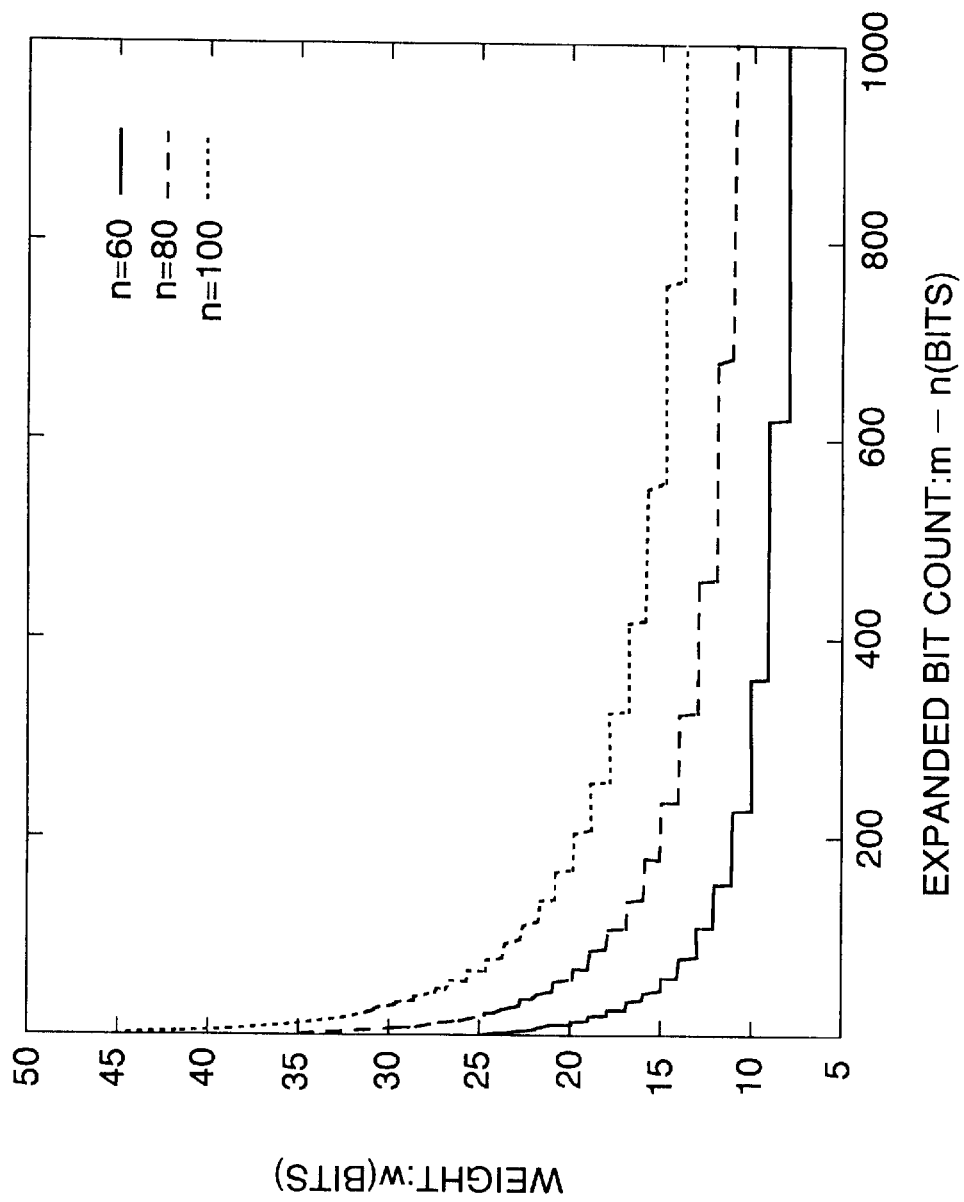
FIG. 7 is a graph plotting the relationship between expanded bit count and weight in the first invention.

The relationship between the weight w and the expanded bit count m−n calculated using Condition 6 noted earlier, in cases where the size of the plain text is n=60, 80, and 100 bits, respectively, is graphed in FIG. 7, with the expanded bit count plotted on the horizontal axis and the weight plotted on the vertical axis. As understood from FIG. 7, although it is difficult to limit the weight below a constant value as the expanded bit count becomes larger, when the expanded bit count is small, the weight can be severely limited.

From Equation 11 it is seen that the rate is dependent also on the secret vector a and not only on the weight W. We now consider the rates in two modes, respectively, which are defined as follows.

Mode 1: Size of all components in the secret vector a is made k bits.

Mode 2: Prime numbers up to the m'th prime number are used in the components of the secret vector a.

Figure 8:
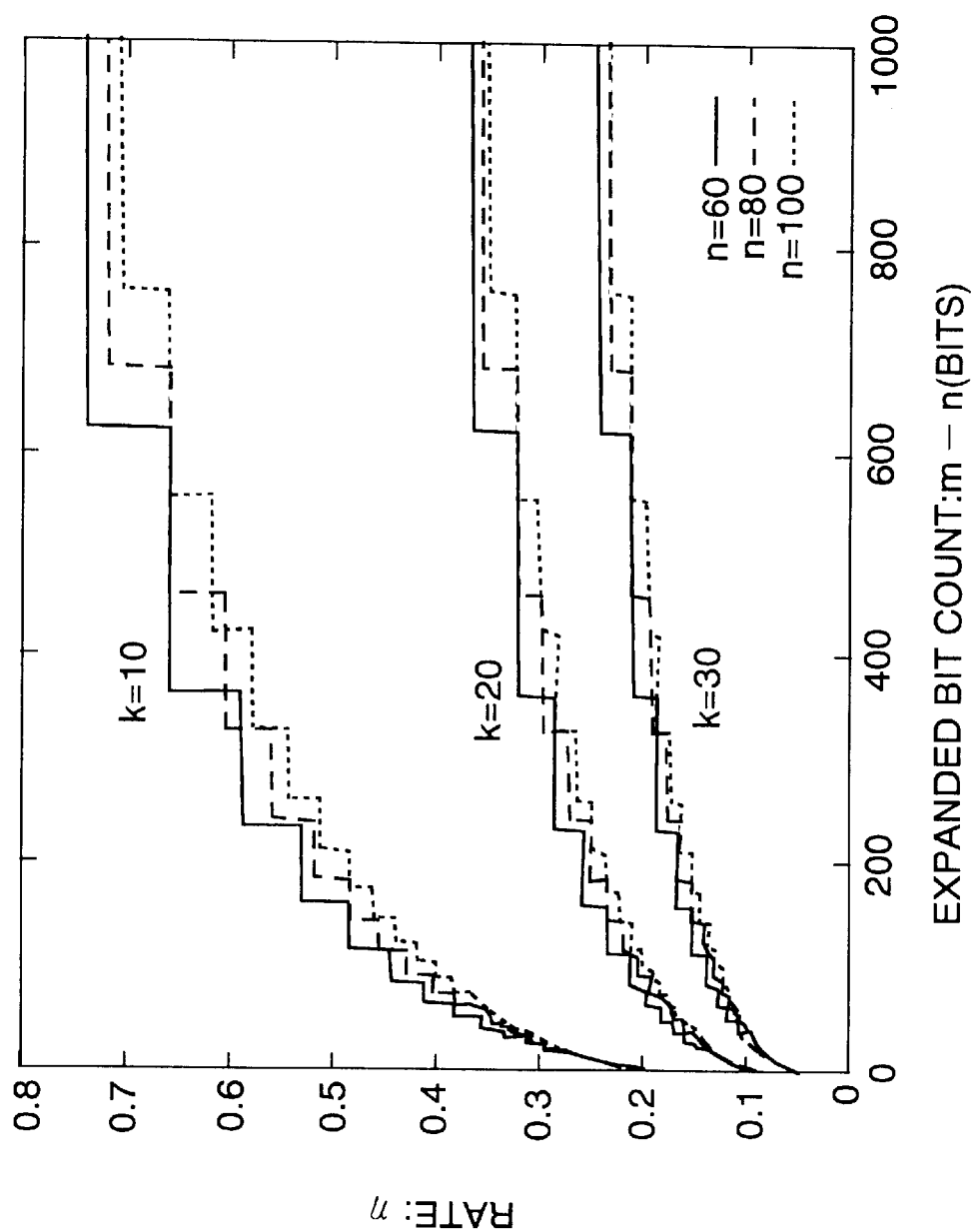
FIG. 8 is a graph plotting the relationship between expanded bit count and rate in the mode 1 in the first invention.

For mode 1, considering the cases where n=60, 80, and 100 bits and k=10, 20, and 30 bits, the expanded bit count m−n and the rate $\eta$ are plotted on the horizontal axis and vertical axis, respectively, in the graph in FIG. 8. In FIG. 8, it is assumed that an infinite number of k-bit primes exist. In actuality, however, only a finite number of such primes exist, wherefore FIG. 8 contains in part a range which cannot be represented.

Figure 9:
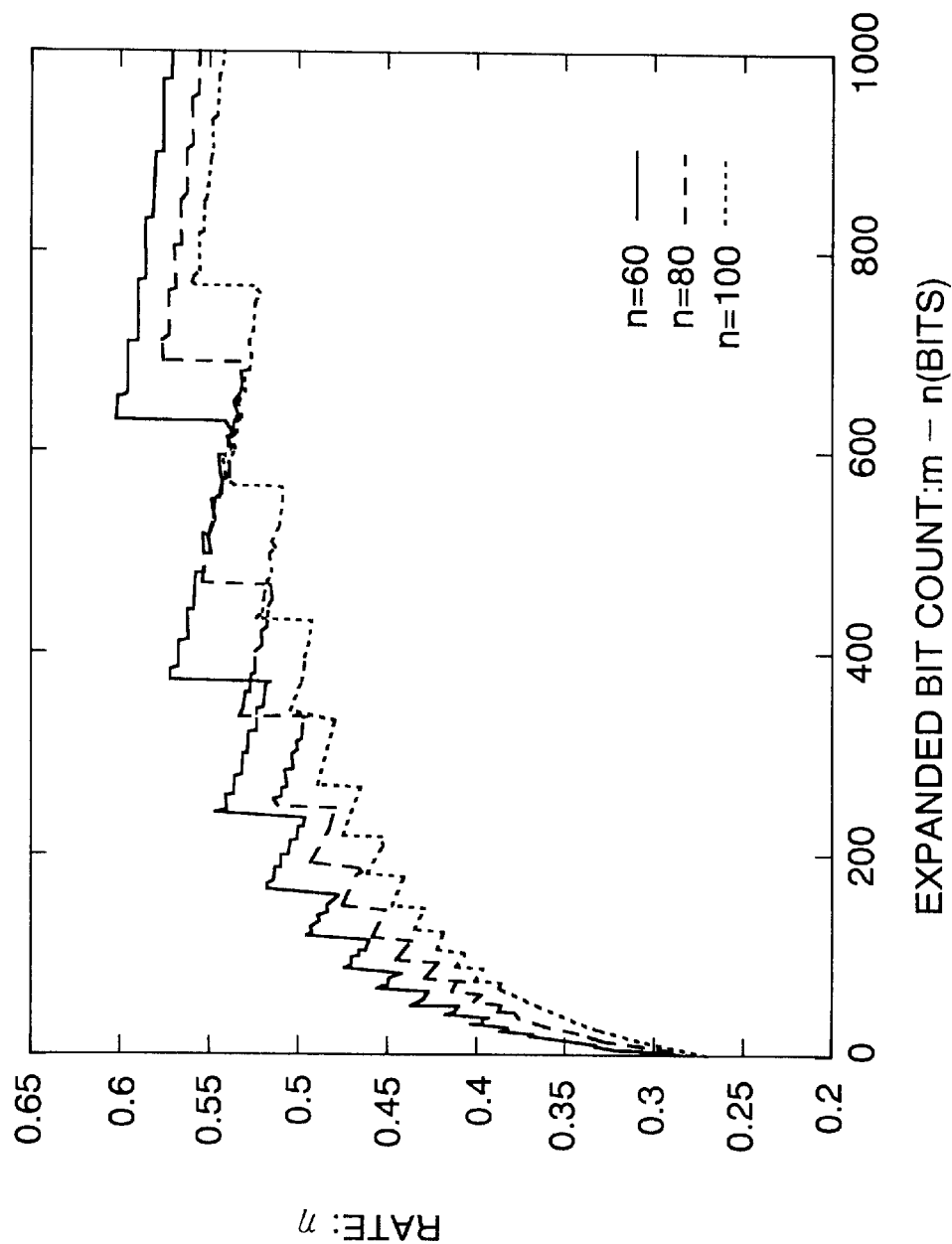
FIG. 9 is a graph plotting the relationship between expanded bit count and rate in the mode 2 in the first invention.

For mode 2, in cases where n=60, 80, and 100 bits, expanded bit count m−n and the rate $\eta$ are plotted on the horizontal and vertical axes, respectively, in the graph in FIG. 9. In mode 2, when the expanded bit count and the weight are equal, it is seen from Equation 7 that the modulus becomes the smallest, and the rate increases as compared to mode 1.

In order to obtain an El Gamal code rate, that is, a rate of 0.5 or higher, for a plain text n=60 in mode 2 in the first invention, an expanded bit count of only m−n=115 is needed. This means that the El Gamal code rate can be achieved by increasing the key number from 60 bits to 175 bits. This key number is a key number having a practical size. When the expanded bit count is further increased, a higher rate than the El Gamal code rate can be achieved.

Second Embodiment

A second embodiment will be described based on the second invention described earlier. In the second embodiment (the second invention), the number of bits in the plain text vector x is set at 6 (n=6), and the weight to which the plain text is limited is set to 3 (w=3). Accordingly, the number of bits in the expanded plain text vector x is determined at 7 (m=7) to satisfy Condition 9.

The secret and public keys are generated as follows.

| Secret key | |
|---|---|
| secret vector a | vector a = ${}^t(a_1, a_2, \ldots, a_7)$ |
| | gcd $(a_i, a_j) = 1$ $(i \neq j)$ |
| encryption key e | gcd $(e, p_B - 1) = 1$ |
| decryption key d | $ed = 1 \pmod{p_B - 1}$ |
| Public key | |
| modulus (prime) $p_B$ | $p_B > a_i \cdot a_j \cdot a_k$ |
| | ($a_i$, $a_j$ and $a_k$ are three largest components in vector a.) |
| public vector c | vector c = vector $a^e \pmod{p_B}$ |

As specific examples, the secret and public keys are prepared as follows.

vector a=${}^t$(13,9,25,16,7,17,11)
e=15, d=907.
Public key
$p_B$=6803>25·17·16=6800

$$\text{vector } c = \text{vector } a^e$$
$$= {}^t(13^{15}, 9^{15}, 25^{15}, 16^{15}, 7^{15}, 17^{15}, 11^{15})$$
$$= {}^t(131, 6363, 3747, 3633, 3956, 1672, 3868)$$
$$\pmod{6803}$$

At the entity a end, the plain text is made the vector x=${}^t$(1,0,1,1,1,0)=46 and expansion-converted by extended Schalkwijk decoding to vector s=(0,1,0,0,1,1,0) and that expanded plain text vector s is encrypted to yield the cipher text C. This cipher text C thus produced is transmitted over the communications network 3 from entity a to entity b (FIG. 6).

$$C = 6363 \cdot 3956 \cdot 1672$$
$$= 532 \pmod{6803}$$

On the entity b end, the received cipher text C is raised to the power of d to convert it to A, a divisibility determination is made on A using the components of the secret vector a, and the expanded plain text vector s is obtained.

$$A = C^d 532^{907} = 1071 \pmod{6803}$$

$$s = {}^t\left(\left\langle\frac{1071}{13}\right\rangle, \left\langle\frac{1071}{9}\right\rangle, \left\langle\frac{1071}{25}\right\rangle, \left\langle\frac{1071}{16}\right\rangle, \left\langle\frac{1071}{7}\right\rangle, \left\langle\frac{1071}{17}\right\rangle, \left\langle\frac{1071}{11}\right\rangle\right)$$

$$= {}^t(0, 1, 0, 0, 1, 1, 0)$$

From the expanded plain text vector s is obtained, by employing extended Schalkwijk encoding, the plain text vector x=46=(1,0,1,1,1,0).

Whereas in the conventional MK encryption method described earlier we had a modulus $p_{MK}$=556921 and a rate $\eta_{MK}$≈0.26, in the second embodiment described above we have a modulus $p_B$=6803 and a rate $\eta_B$≈0.46. Hence, with only a 1-bit plain text expansion, we can realize a rate nearly double the conventional rate. In order to achieve the same rate level for plain text of the same size, a 3-bit plain text expansion is needed in the first embodiment, but in the second embodiment, only a 1-bit plain text expansion suffices. In other words, the second embodiment (second invention) can achieve the same rate level as the first embodiment (first invention) with a smaller number of expansion bits.

Let us now consider how this second invention may be evaluated. For the rate $\eta_B$ in this second invention, we may derive Equation 12 below from Equation 10.

$$\eta_B = \frac{n}{\log_2 p_B} < \frac{n}{\log_2\left\{\underset{s \in T(m,w)}{\text{Max}}({}^t a^s)\right\}} \quad (12)$$

Whereas the rate is dependent only on the vector a in the case of the conventional MK encryption method, in the case of the second invention, as with the first invention, the rate is dependent on the weight w as well as on the vector a.

Figure 10:
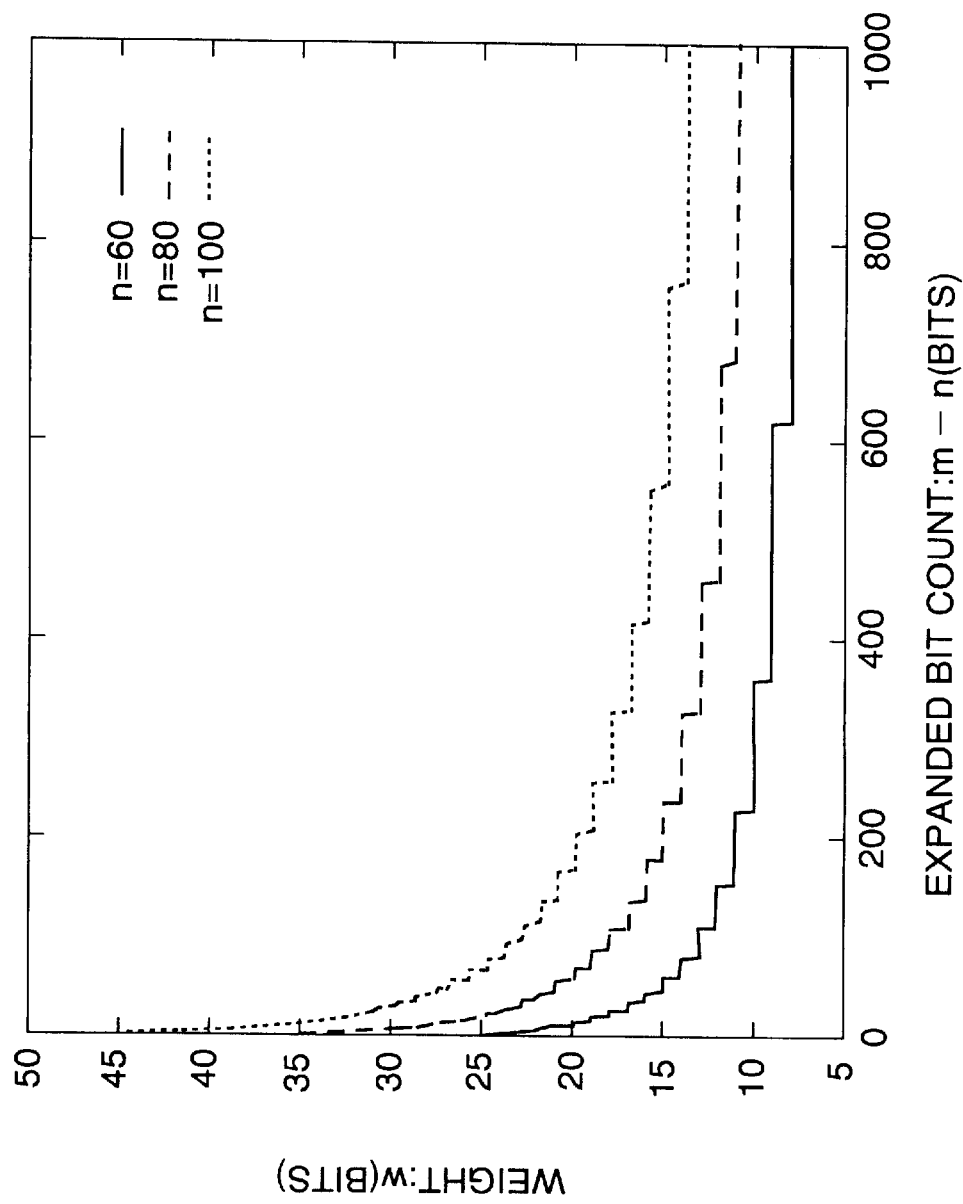
FIG. 10 is a graph plotting the relationship between expanded bit count and weight in the second invention.

The relationship between the weight w and the expanded bit count m−n calculated using Condition 9, in cases where the size of the plain text is n=60, 80, and 100 bits, respectively, is graphed in FIG. 10, with the expanded bit count plotted on the horizontal axis and the weight plotted on the vertical axis. By substituting x=y=1 in the binomial theorem in Equation 13 below, Equation 14 is arrived at, from which Equation 15 below is derived. It is understood from Equation 15 that simply performing a 1-bit expansion on the plain text provides the weight as shown in Equation 16.

$$(x+y)^n = {}_nC_0 x^n + {}_nC_1 x^{n-1} y + \ldots + {}_nC_n y^n \quad (13)$$

$$2^n = {}_nC_0 + {}_nC_1 + \ldots + {}_nC_n \quad (14)$$

$$2^n = \frac{1}{2}\sum_{j=0}^{n+1} {}_{n+1}C_j = \sum_{j=0}^{\left[\frac{n}{2}\right]} {}_{n+1}C_j \quad (15)$$

$$\left[\frac{n}{2}\right] \quad (16)$$

A characteristic of the second invention, particularly when the size of the plain text is an even number of bits, is that the weight of the expanded plain text becomes exactly half that of the original plain text with only a 1-bit expansion. This means, in other words, that the rate in the second invention after the 1-bit plain text expansion is improved to roughly twice the conventional rate.

In the second invention also, as in the first invention, modes 1 and 2 are established, and the rate is considered in each mode below.

Figure 11:
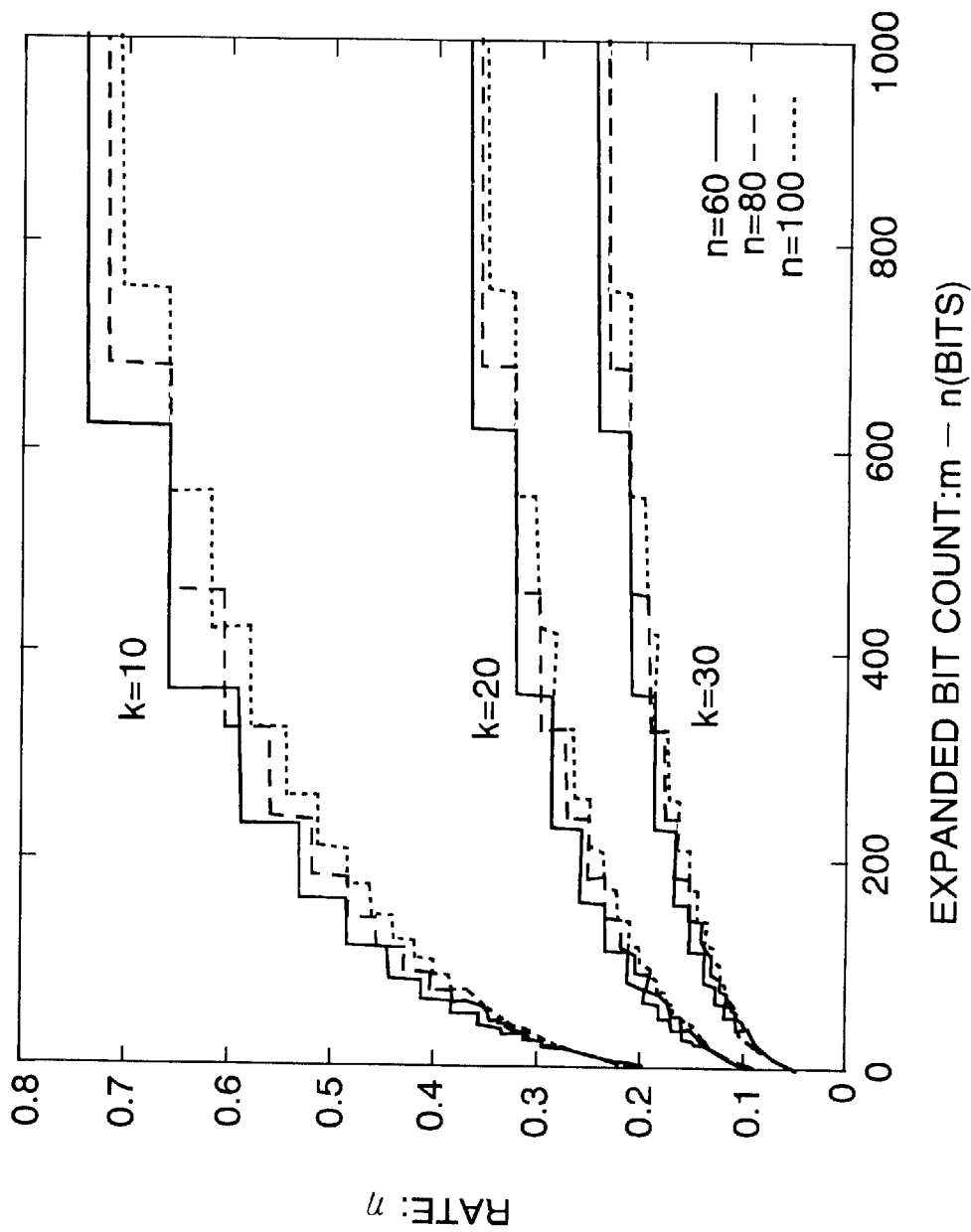
FIG. 11 is a graph plotting the relationship between expanded bit count and rate in the mode 1 in the second invention.
Figure 12:
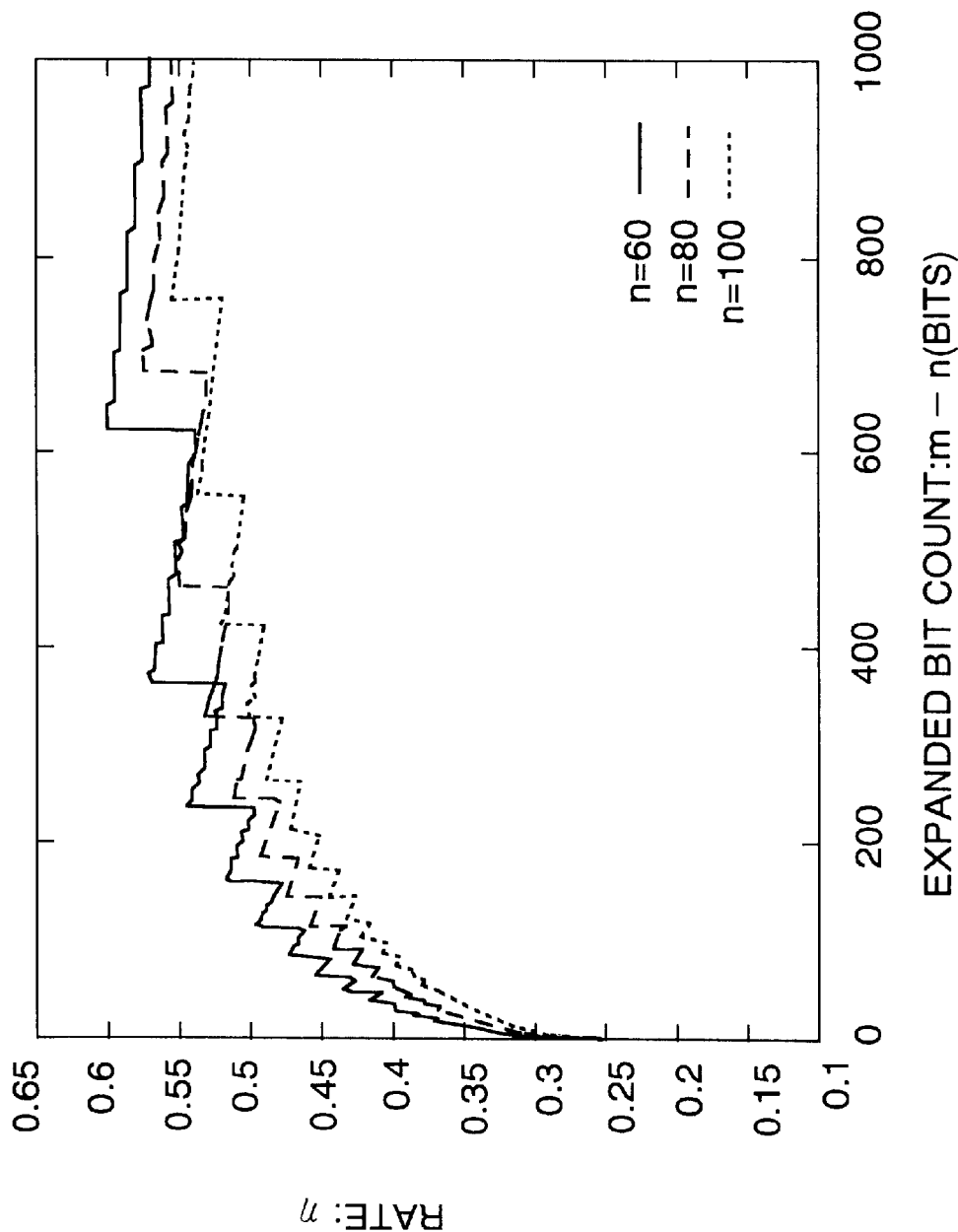
FIG. 12 is a graph plotting the relationship between expanded bit count and rate in the mode 2 in the second invention.
Figure 13:
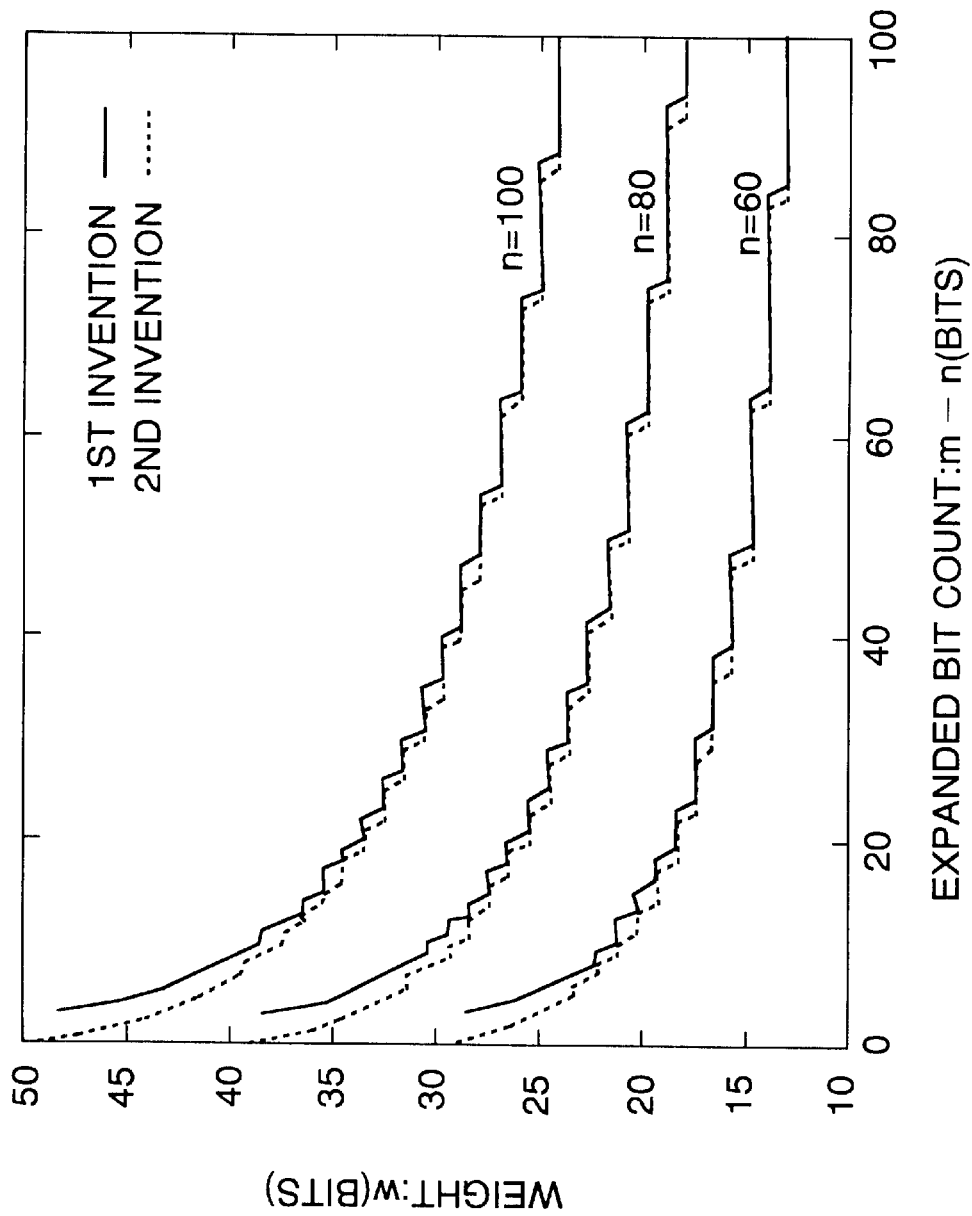
FIG. 13 is a graph plotting the relationship between expanded bit count and weight in the first and second inventions.
Figure 14:
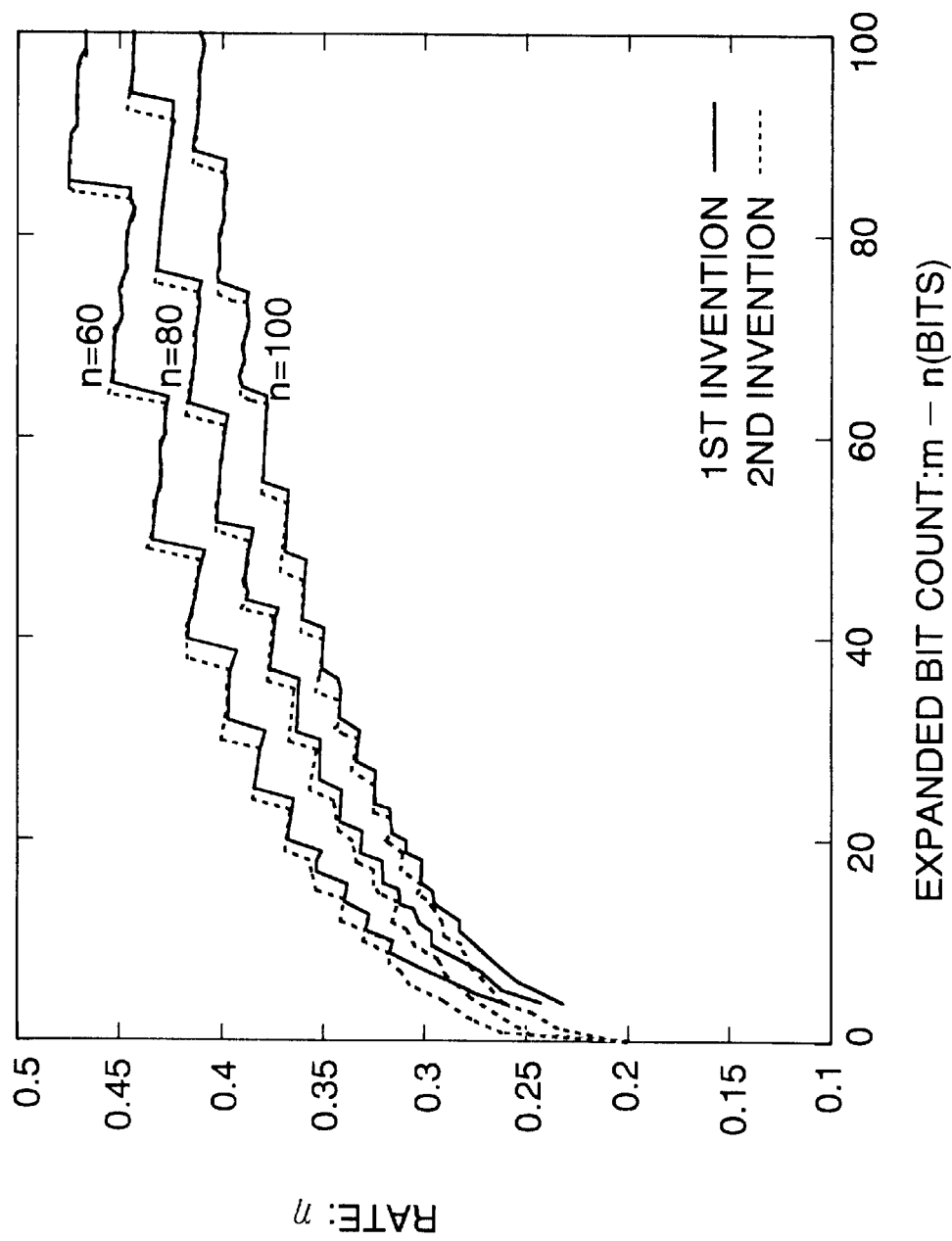
FIG. 14 is a graph plotting the relationship between expanded bit count and rate in the first and second inventions.

For mode 1, considering the cases where n=60, 80, and 100 bits and k=10, 20, and 30 bits, the expanded bit count m−n and the rate η are plotted on the horizontal axis and vertical axis, respectively, in the graph in FIG. 11. For mode 2, in cases where n=60, 80, and 100 bits, the expanded bit count m−n and the rate η are plotted on the horizontal and vertical axes, respectively, in the graph in FIG. 12.

A comparison of the first invention and the second invention is now discussed. The results of calculating the weights and rates in the first and second inventions are plotted in FIG. 13 and FIG. 14, respectively. In these figures, the solid-line curves represent the first invention and the dotted-line curves represent the second invention.

When the plain text and the expanded bit count are the same, a smaller modulus is used in the second invention than in the first invention, so a higher rate can be realized in the second invention. When the expanded bit count is small, i.e., when it is between 1 and several bits, no or little improvement can be made on the rate with the first invention, but with the second invention, a high rate can be achieved that is roughly double the rate with conventional MK coding. It should be noted, however, that when the expanded bit count becomes large, the difference between the rates realized with the first and second inventions becomes small. It will be practical to use the first invention when high-speed processing is wanted, and to use the second invention when wanting to make the number of keys smaller.

The limiting rate values in the present invention are now considered. In determining the rate limits the more efficient mode 2 is used. Thereupon, when the weight is limited to w=1, the rate η(n), from Equation 12, is given by Equation 17 below.

$$\eta(n) = \frac{n}{\underset{1 \leq i < m}{\text{Max}}(a_i)} \quad (17)$$

At this time, the largest component $a_i$ will be the m'th (i.e. the $2^m$'th) prime number. Here, from the prime number theorem, the $2^m$'th prime≈$2^n$ ln $2^n$, so the rate η(n) can be estimated at approximately 1, as indicated in Equation 18 below.

$$\eta(n) \cong n/\{\log_2(2^n \ln 2^n)\} \quad (18)$$

$$= n/\{n + \log_2(\ln 2^n)\}$$

In the case where the size of the plain text is n=100, for example, we have η(n)=0.94. Moreover, when the limiting value of the rate is found on the basis of Equation 18, Equation 19 below is obtained, whereupon it is seen that the encryption efficiency converges to 1.

$$\lim_{n \to \infty} \eta(n) = 1 \quad (19)$$

In the examples described in the foregoing, either a Schalkwijk algorithm or an extended Schalkwijk algorithm is used as the procedure for limiting the weight of the plain text, but it is of course permissible to use some other procedure for this.

Moreover, the examples described in the foregoing assume applications of the present invention in a multiplication MK cryptosystem, but that is only a suggestion, and the present invention can be employed in all encryption schemes involving rate improvement by the limitation of the weight.

As set forth in the foregoing, in the present invention, the plain text is first converted to the expanded plain text with the limited weight, and this expanded plain text is then encrypted. A small modulus can therefore be used, as a consequence of which the rate can be sharply improved as compared to conventional methods. As a result, the present invention is able to contribute greatly to opening avenues for achieving practicality in various encryption schemes heretofore considered very difficult to employ practically.

The encryption method described above is disclosed in Japanese Patent Application No. 10-211353 filed Jul. 27, 1998 in Japan and the subject application claims priority of this Japanese Patent Application, entire disclosure of which is incorporated herein by reference.

What is claimed is:

1. An encryption method for converting plain text into cipher text, comprising:

converting said plain text into expanded plain text having a larger number of bits than said plain text to limit weight of said plain text; and encrypting said expanded plain text into cipher text.

2. The encryption method according to claim 1, wherein, when number of bits in said plain text and said expanded plain text is expressed by n and m (where n>m) respectively and the weight of said plain text is limited to w, m is determined so as to satisfy relationship $m^C w \geq 2^n$.

3. The encryption method according to claim 1, wherein, when converting said plain text to said expanded plain text, a Schalkwijk decoding algorithm is used.

4. An encryption method for converting a binary sequence of n bits of plain text to cipher text comprising the steps of:

finding m (where n<m), to satisfy condition $m^C w \geq 2^n$, in order to limit weight of said n bits of plain text to w;

converting said n bits of plain text to a binary sequence of m bits of expanded plain text, using a Schalkwijk decoding algorithm, with said n bits of plain text being handled as an integer and that integer being considered as an index; and producing cipher text using said expanded plain text and a public key.

5. The encryption method according to claim 1, wherein, when converting said plain text to said expanded plain text, an extended Schalkwijk decoding algorithm is used.

6. An apparatus, comprising:

an encryptor for producing cipher text from plain text using an encryption method comprising:
converting said plain text into expanded plain text having a larger number of bits than said plain text to limit weight of said plain text;
encrypting said expanded plain text into cipher text; and a decrypter for decrypting said cipher text so produced back into said plain text.

7. The apparatus according to claim 6, wherein, when number of bits in said plain text and said expanded plain text is expressed by n and m (where n<m) respectively and the weight of said plain text is limited to w, m is determined so as to satisfy relationship $m^C w \geq 2^n$.

8. The encryption method according to claim 6, wherein, when converting said plain text to said expanded plain text, a Schalkwijk decoding algorithm is used.

9. An apparatus comprising:

an encryptor for producing cipher text from a binary sequence of n bits of plain text using an encryption method including the steps of:
finding in (where n<m) to satisfy condition $m^C w \geq 2^n$, in order to limit weight of said n bits of plain text to w,
converting said n bits of plain text to a binary sequence of m bits of expanded plain text, using a Schalkwijk decoding algorithm, with said n bits of plain text being handled as an integer and that integer being considered as an index, and
producing cipher text using said expanded plain text and a public key; and a decrypter for decrypting said cipher text so produced back into said plain text.

10. The apparatus according to claim 6, wherein, when converting said plain text said expanded plain text, an extended Schalkwijk decoding algorithm is used.

11. A code communication system for communicating information based on cipher text between a plurality of entities, comprising:

an encryptor for producing cipher text from plain text using an encryption method comprising:
converting said plain text into expanded plain text having a larger number of bits than said plain text to limit weight of said plain text, and
encrypting said expanded plain text into cipher text:

a communication path for transmitting said cipher text so produced from one entity to another entity; and a decrypter for decrypting said cipher text so transmitted back into original plain text.

12. The code communications system according to claim 11, wherein, when number of bits in said plain text and said expanded plain text is expressed by n and m (where n<m) respectively and the weight of said plain text is limited to w, m is determined so as to satisfy relationship $m^C w \geq 2^n$.

13. The code communications system according to claim 11, wherein, when converting said plain text to said expanded plain text, a Schalkwijk decoding algorithm is used.

14. A code communications system for communicating information based on cipher text between a plurality of entities, comprising:

an encryptor for producing cipher text from a binary sequence of n bits of plain text using an encryption method including the steps of:
finding m (where n<m) to satisfy condition $m^C w \geq 2^n$ in order to limit weight of said n bits of plain text to w,
converting said a bits of plain text to a binary sequence of m bits of expanded plain text, using a Schalkwijk decoding algorithm, with said n bits of plain text being handled as an integer and that integer being considered as an index; and
producing cipher text using said expanded plain text and a public key;

a communication path for transmitting said cipher text so produced from one entity to another entity; and a decrypter for decrypting said cipher text so transmitted back into original plain text.

15. The code communications system according to claim 11, wherein, when converting said plain text to said expanded plain text, an extended Schalkwijk decoding algorithm is used.

* * * * *